Dec. 3, 1940.  M. K. JESSUP  2,223,993

VEHICLE TRACTION PLOW

Filed Aug. 27, 1938

INVENTOR.
MORRIS K. JESSUP

BY Gourley & Budley
ATTORNEYS.

Patented Dec. 3, 1940

2,223,993

UNITED STATES PATENT OFFICE 2,223,993

VEHICLE TRACTION PLOW

Morris K. Jessup, Grosse Pointe Park, Mich., assignor, by mesne assignments, to United States Rubber Company, New York, N. Y., a corporation of New Jersey Application August 27, 1938, Serial No. 227,049

5 Claims. (Cl. 97—47)

This invention relates to tractors, and in particular it relates to a plow adaptable for cooperation with a tractor for the purpose of increasing the traction quality of the tractor.

In general, the invention comprises means cooperable with the drive wheels of a tractor for disturbing the ground surface with which the tractor wheels engage, for the purpose of forming a surface having higher traction characteristics.

Pneumatic tires are being used more extensively on farm equipment, such as on tractors. One of the difficulties in the use of pneumatic tires on tractors is ineffective traction encountered in plowing or carrying out other heavy draw-bar-pull operations on soil covered with vegetation. The moisture content of grass or other plant life forms a lubricant which causes the rubber tires to slip, resulting in low traction properties of the tractor.

I provide a scalping tool which, in combination with a tractor, engages the soil in front of the tractor drive wheels and forms a path as wide as the tread of the tire. The scalping tool turns a strip of vegetation sod laterally of the direction of travel of the tractor, thus removing the vegetation from the path of the tractor and permitting the tractor drive wheels to engage the firm soil underlying the vegetation.

Among the objects of my invention are, to provide increased draw-bar-pull properties of tractors; to reduce operating time by decreasing tire slippage; to provide a constant speed in pulling operation; and to provide an efficient and economical means for increasing tractor performance.

These and other objects and advantages will appear more fully in the following detailed description, when considered in connection with the accompanying drawing, in which.

Figure 1:
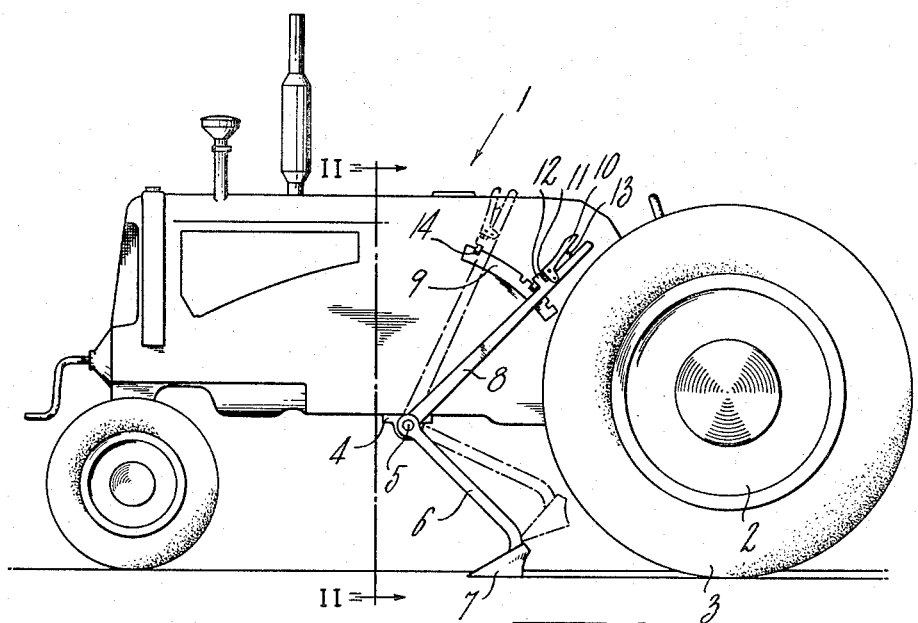
Fig. 1 is a side elevational view of a tractor and a traction plow, illustrating an inventive embodiment of the combination.

Referring to the drawing, and in particular to Fig. 1, I show a tractor 1 of conventional manufacture including a drive wheel 2 on which is mounted a pneumatic tire 3. Mounted in front of the wheel 2 and on the under side of the tractor is a pair of brackets 4 which rotatably support a shaft 5. An arm 6 is keyed to each end of the shaft 5 and a plow 7 is attached to the opposite end of the arm 6. The plow 7 is located directly in front of the path of travel of the pneumatic tire 3. The shaft 5 being pivotally mounted in the bearings 4 permits the plow 7 through manual means to be moved into or out of engagement with the ground. The manual means include a lever 8 keyed to the shaft 5 and extending in a position within reach of the operator of the tractor. A segment 9 attached to the side of the tractor cooperates with the lever 8 for maintaining the plow in a ground engaging position, or in an elevated position as indicated by the dot and dash lines in Fig. 1. A hand grip 10 pivotally attached to the lever 8 moves a latch 11 slidably mounted in a lug 12 extending from the lever 8. A spring 13 normally maintains the latch 11 in engagement with the segment 9. A plurality of notches 14 formed in the segment 9 permit engagement of the latch 11 therewith for the purpose of locking the plow in an elevated position or in a position of varying depth relative to the ground.

Figure 3:
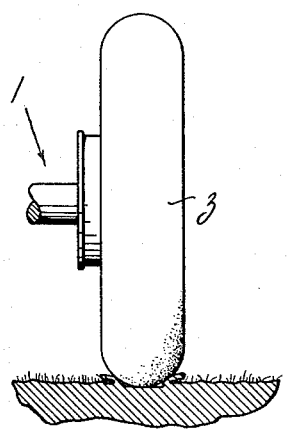
Fig. 3 is a front view of a traction wheel, illustrating the wheel in engagement with the soil after removal of vegetation.
Figure 2:
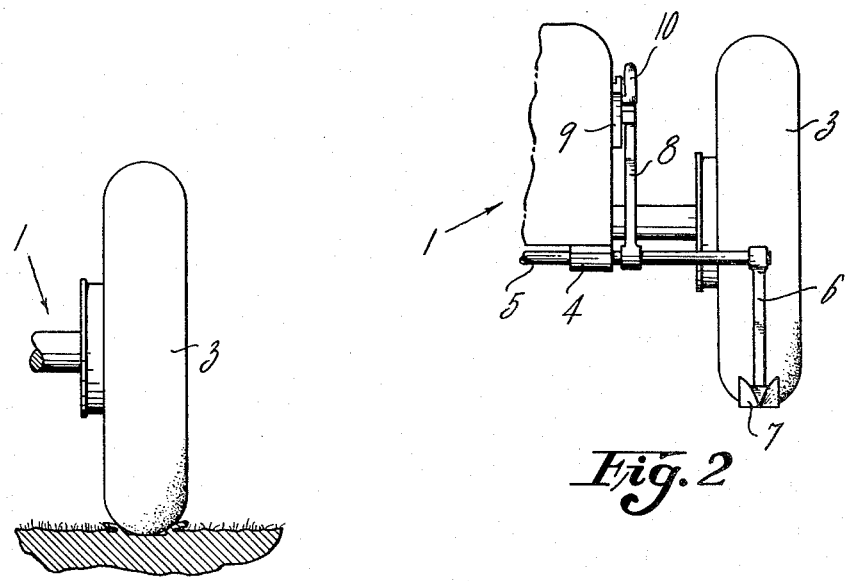
Fig. 2 is a front elevational view of a portion thereof, the view being taken along lines II—II of Fig. 1.

Further details of the plow and its function are illustrated in Figs. 2 and 3. While the plow is shown in combination with a single drive wheel, it is to be understood that a similar plow is associated with the opposite drive wheel. A plow for the purpose herein described should be as narrow as possible relative to the width of the tread of the pneumatic tire in order to minimize the power required for its operation. By providing a plow having a width of approximately half the width of the tire tread with which a plow cooperates, it is possible to form a cut in the sod and turn the sod over laterally of the path of the tire so that the tread of the tire will not come into engagement with surface vegetation. Fig. 3 illustrates this method of turning back the sod, thus permitting the tire to come into direct engagement with the soil underlying the vegetation and resulting in a substantial improvement in tractive properties of the drive wheel of the tractor. Varying conditions of traction may be obtained by controlling the penetrating depth of the plow depending on the character of the vegetation. It is indicated that the tractive effort necessary to move the plow in engagement with the ground will not exceed 150 to 200 pounds, whereas it is indicated that the gain in traction will be in the order of 1000 or more pounds. It is, therefore, apparent that the scalping tool or traction plow utilized in combination as herein provided has definite advantages in increasing performance of tractors operating over vegetation covered soil.

While I have shown and described a preferred embodiment of my invention, it is to be understood that it is susceptible of other modifications as appear within the scope of the appended claims.

Having thus described my invention, what I claim and desire to protect by Letters Patent is:

1. In combination with a motor vehicle having a drive wheel equipped with a pneumatic tire, a scalping tool attached to the vehicle and located in a path preceding the drive wheel of the vehicle, said scalping tool having a substantially horizontally disposed cutting edge of a width less than the width of the tire, and being adaptable for engagement with the vehicle supporting surface so as to remove a substantially flat horizontal layer of vegetation covered soil from the path of the drive wheel.

2. In combination with a motor vehicle having a drive wheel equipped with a pneumatic tire, an arm pivotally attached to the vehicle, a scalping tool, attached to the arm and located in a path preceding the drive wheel of the vehicle, and means for swinging the arm on its pivot for raising and lowering the scalping tool relative to engagement with the vehicle supporting surface, said scalping tool having a substantially horizontal cutting edge of a width less than the width of the tire and being of such shape as to fold a layer of vegetation sod cut by said cutting edge laterally thereof and thereby produce an improved traction surface materially wider than the width of said cutting edge.

3. In combination with a motor vehicle having drive wheels equipped with pneumatic tires, a transverse shaft pivotally attached to the vehicle forwardly of but adjacent said drive wheels, an arm attached to each end of the shaft, a scalping tool carried by each arm and in longitudinal alignment with one of the pneumatic tires, and a control lever operatively associated with said arms and shaft for swinging the scalping tools to and from various positions of vertical adjustment, said scalping tools each having a width less than the width of the tire and being of such shape as to sever a relatively thin flat layer of vegetation covered soil from the drive wheel supporting surface and fold it laterally of the path of the tire so as to produce an improved traction surface therefor.

4. The combination with a motor vehicle having steering wheels, drive wheels equipped with pneumatic tires, of a transverse shaft pivotally attached to the vehicle forwardly of but adjacent said drive wheels and to the rear of the area of movement of the steering wheels and cooperating only with the drive wheels, an arm attached to each end of the shaft, a scalping tool carried by the free end of each arm and in longitudinal alignment with one of said pneumatic tires, and a control lever operatively associated with said arms and shaft for swinging the scalping tools to and from various positions of vertical adjustment, said scalping tools each having a width less than the width of the tire and being of such shape as to sever a relatively thin flat layer of vegetation covered soil from the drive wheel supporting surface and fold it laterally of the path of the tire so as to produce an improved traction surface therefor.

5. The combination with a motor vehicle having steering wheels, drive wheels equipped with pneumatic tires, of a transverse shaft pivotally attached to the vehicle forwardly of but adjacent said drive wheels, an arm attached to each end of the shaft and extending downwardly and rearwardly therefrom, a scalping tool carried by the free end of each arm, each scalping tool being in longitudinal alignment with one of the pneumatic tires and arranged to swing from an inoperative position beneath the forward portion of the tire downwardly through a relatively small angle to an operative position immediately preceding the tire so as to receive a minimum of influence resulting from lateral deviation of the forward portion of the vehicle due to the steering of the vehicle, and a manual control operatively associated with said arms and shaft for swinging said scalping tools to and from said positions, each scalping tool having a substantially horizontal cutting edge of a width materially less than the width of the pneumatic tire and being of such shape as to fold a relatively thin flat layer of vegetation covered soil laterally from the path of the tire and produce a traction surface of a width greater than that of said cutting edge.

MORRIS K. JESSUP.